United States Patent
Olszewski

(10) Patent No.: US 9,285,215 B2
(45) Date of Patent: Mar. 15, 2016

(54) BELT ALIGNMENT TOOL AND SYSTEM OF USE

(71) Applicant: Michael A. Olszewski, Coldwater, MI (US)

(72) Inventor: Michael A. Olszewski, Coldwater, MI (US)

(*) Notice: Subject to any disclaimer, the term of this patent is extended or adjusted under 35 U.S.C. 154(b) by 48 days.

(21) Appl. No.: 14/466,593

(22) Filed: Aug. 22, 2014

(65) Prior Publication Data

US 2015/0052764 A1 Feb. 26, 2015

Related U.S. Application Data

(60) Provisional application No. 61/869,197, filed on Aug. 23, 2013.

(51) Int. Cl.
*G01B 11/27* (2006.01)

(52) U.S. Cl.
CPC .................... *G01B 11/272* (2013.01)

(58) Field of Classification Search
CPC .............. G01B 11/27; G01B 11/272
USPC .......................................... 33/286
See application file for complete search history.

(56) References Cited

U.S. PATENT DOCUMENTS

| | | | |
|---|---|---|---|
| 4,130,362 A | 12/1978 | Lill et al. | |
| 5,987,762 A * | 11/1999 | Toth | G01B 11/27 33/227 |
| 6,031,616 A | 2/2000 | Seiffert | |
| 6,374,507 B1 * | 4/2002 | Lehto | G01B 11/27 33/286 |
| 6,704,115 B1 | 3/2004 | Hamar | |
| 6,931,738 B2 | 8/2005 | Bodgren et al. | |
| 6,968,625 B2 | 11/2005 | Segerstrom et al. | |
| 7,042,561 B1 | 5/2006 | Andersson | |
| 7,412,773 B2 | 8/2008 | Hobel et al. | |
| 2003/0051354 A1 * | 3/2003 | Segerstrom | G01B 11/272 33/286 |
| 2006/0274311 A1 * | 12/2006 | Andersson | G01B 11/27 356/399 |
| 2011/0094116 A1 * | 4/2011 | Diefenderfer | F16H 57/022 33/286 |
| 2014/0223750 A1 * | 8/2014 | Diefenderfer | G01B 11/272 33/286 |
| 2015/0176984 A1 * | 6/2015 | Donovan | G01B 11/27 33/286 |
| 2015/0300802 A1 * | 10/2015 | Linde | G01B 7/31 73/494 |

FOREIGN PATENT DOCUMENTS

| | | |
|---|---|---|
| DE | 10025918 A1 | 11/2001 |
| EP | 1041358 A2 | 10/2000 |

* cited by examiner

*Primary Examiner* — G. Bradley Bennett
(74) *Attorney, Agent, or Firm* — Dinsmore & Shohl LLP; Douglas L. Wathen

(57) ABSTRACT

A system for alignment of a pulley system and a method of use are provided. A laser alignment tool includes an arcuate front surface having a target pattern of parallel vertical lines. The tool is provided with a laser light source that projects a laser light beam through an aperture in the front surface. A pair of laser alignment tools may be mounted on two pulleys of a pulley system such that the laser light beams are displayed on the target pattern of the opposite laser alignment tool. In the event of a misalignment, the laser light beams displayed on the target patterns do not align with the vertical lines thereon. A user may adjust the pulleys so that the laser light beams produced by each laser alignment tool are aligned with the vertical lines of the opposite laser alignment tool to achieve alignment of the pulley system.

19 Claims, 7 Drawing Sheets

BELT ALIGNMENT TOOL AND SYSTEM OF USE

CROSS REFERENCE TO RELATED APPLICATION

This application claims priority from U.S. provisional patent application Ser. No. 61/869,197, filed Aug. 23, 2013, the contents of which are incorporated herein in their entirety.

FIELD OF THE INVENTION

The present invention relates generally to a tool and a system for belt alignment, particularly for preventative maintenance on mechanical systems such as motors and belt/pulley systems.

BACKGROUND OF THE INVENTION

In a manufacturing environment, motors are used that often include a pulley and a belt construction. The belt is wrapped over a pulley defining a groove for receiving the belt and driven by a shaft by one motor to rotate a shaft on a separate device also having a pulley and a groove for receiving the belt. Belt misalignment causes premature destruction and degradation of the mechanical system due to unwanted vibration or other forms of mechanical error. If the pulleys and belts are not properly aligned, the belt will break or cause the other moving parts of the system to break. This forces unexpected repair and system shutdown. When a machine breaks unexpectedly and causes shutdown and repair, such an operation causes significant time, efficiency, and economic losses. Accordingly, preventive maintenance to ensure proper belt alignment can significantly improve the efficiency of system operations, improve the life cycle of the mechanical parts, and save significant costs associated with repair and replacement.

Belt alignment systems are known and have been used for many years to correct for expected movement and misalignment between components of a pulley system. However, these belt alignment systems are subject to misinterpretation and error requiring significant human involvement and training. Moreover, the most effective solutions are cost prohibitive, requiring digital readings from an extremely expensive system. Accordingly, there is a need in the industry for an accurate and relatively cost-effective solution for belt alignment without the significant cost and training time required of existing systems.

SUMMARY OF THE INVENTION

The present disclosure generally relates to a belt alignment tool, system and method of use. An embodiment of the tool includes an elongated main body having a target pattern on a front face at a first elongated side and one or more of inwardly curving arches at an opposite rear face. The target face defines outwardly curving geometry. A laser light source is positioned in the center of the main body for generating a relatively wide laser light sheet or beam used as an alignment indicator when aligned with a target pattern of another tool. The laser light beam extends parallel with a plane defined by the elongated main body. The laser light source is adapted to be turned on and off using a power switch positioned on the main body. A target pattern located on the front face may include a plurality of vertical lines that extend the length of the arc and may define an alternating color pattern to allow for the display of a laser light beam thereon. The tool may include at least one magnet on a side mounting surface of the main. The magnet is adapted to magnetically mount to a metal surface and allow the laser light beam to display on a target surface located away from the location of the main body. In a further example, four magnets are provided on the side surface, spaced apart to allow for securely mounting onto a metal surface. The four magnets can be evenly spaced apart to secure most of the surface area of the tool.

In an example, the tool includes a level positioned within the main body and exposed for viewing of a bubble suspended in a transparent liquid to provide an indication that a surface is horizontally or vertically level. The plurality of inward curving arches are sized and shaped to accommodate for magnetic mounting against center hubs or shafts of a pulley system. The laser light source is positioned to allow the laser light beam to project on the target face of another tool to allow for pulley alignment.

The present disclosure further provides for a belt alignment system including at least one tool as previously disclosed further including three magnetic target units to position on a separate pulley. The magnetic target units define target displays for receiving the laser light beam from the alignment tool and allowing for adjustment of the pulley system until the laser beam aligns along target surfaces on all of the targets. The targets can further function and be provided to correct for a pulley offset.

The present disclosure even further relates to a belt alignment system including at least a pair of tools as previously disclosed wherein each tool is positioned facing the other and allows for laser light beam to project along the extended target face for alignment of the corresponding pulley system.

The present disclosure relates to a belt alignment kit comprising at least one tool as previously disclosed, a second tool, an instruction of use manual, and optionally at least three magnetic targets.

The present disclosure provides for a belt alignment tool or system of any of the previous tools disclosed wherein the laser is a green colored laser.

The present disclosure still further provides for a method of belt alignment including the steps of: mounting an alignment tool as previously disclosed onto a first pulley; mounting three targets or a second alignment tool onto an opposing pulley such that the laser output from each tool is facing the other target face or targets; activating the lasers to display a laser light beam parallel to a plane of the pulley groove; moving the pulley system until the laser light displays within the desired target strip; and when using a pair of tools, adjusting the pulley system so as to align both lasers on the target face of the opposite tool.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE INVENTION

Figure 1:
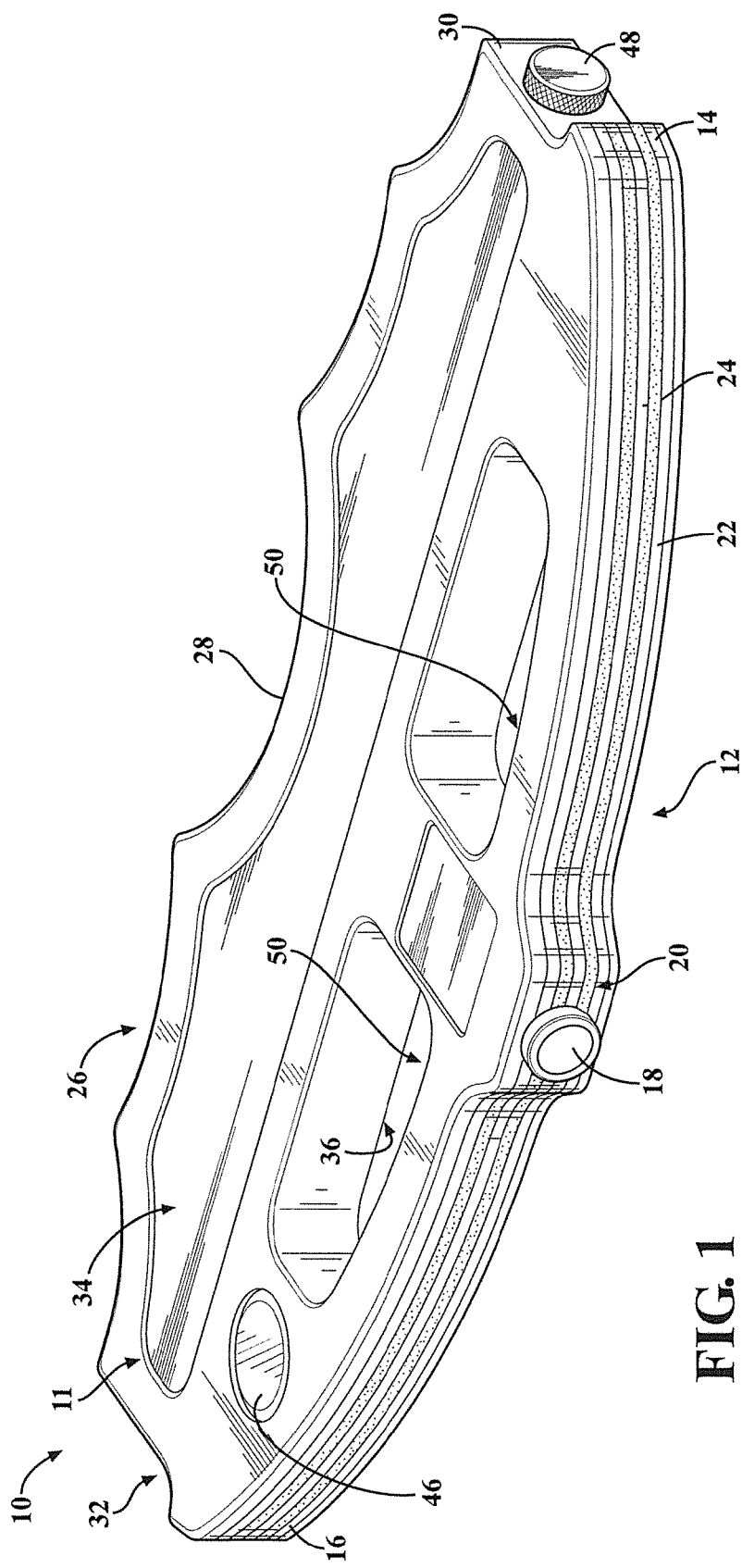
FIG. 1 is a perspective view of an embodiment of a laser alignment tool in accordance with the present invention.
Figure 2:
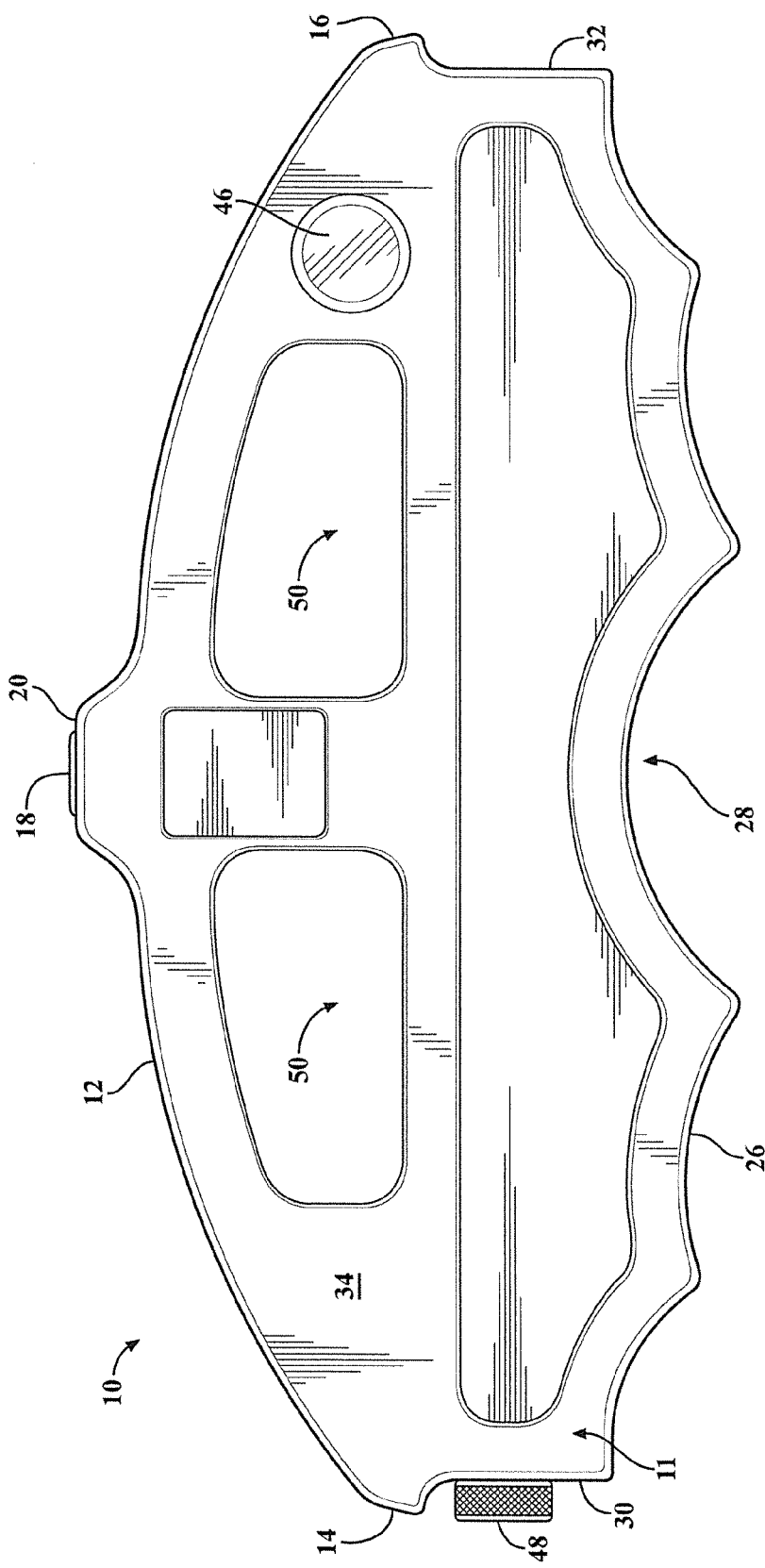
FIG. 2 is a side view of an embodiment of a laser alignment tool in accordance with the present invention.
Figure 3:
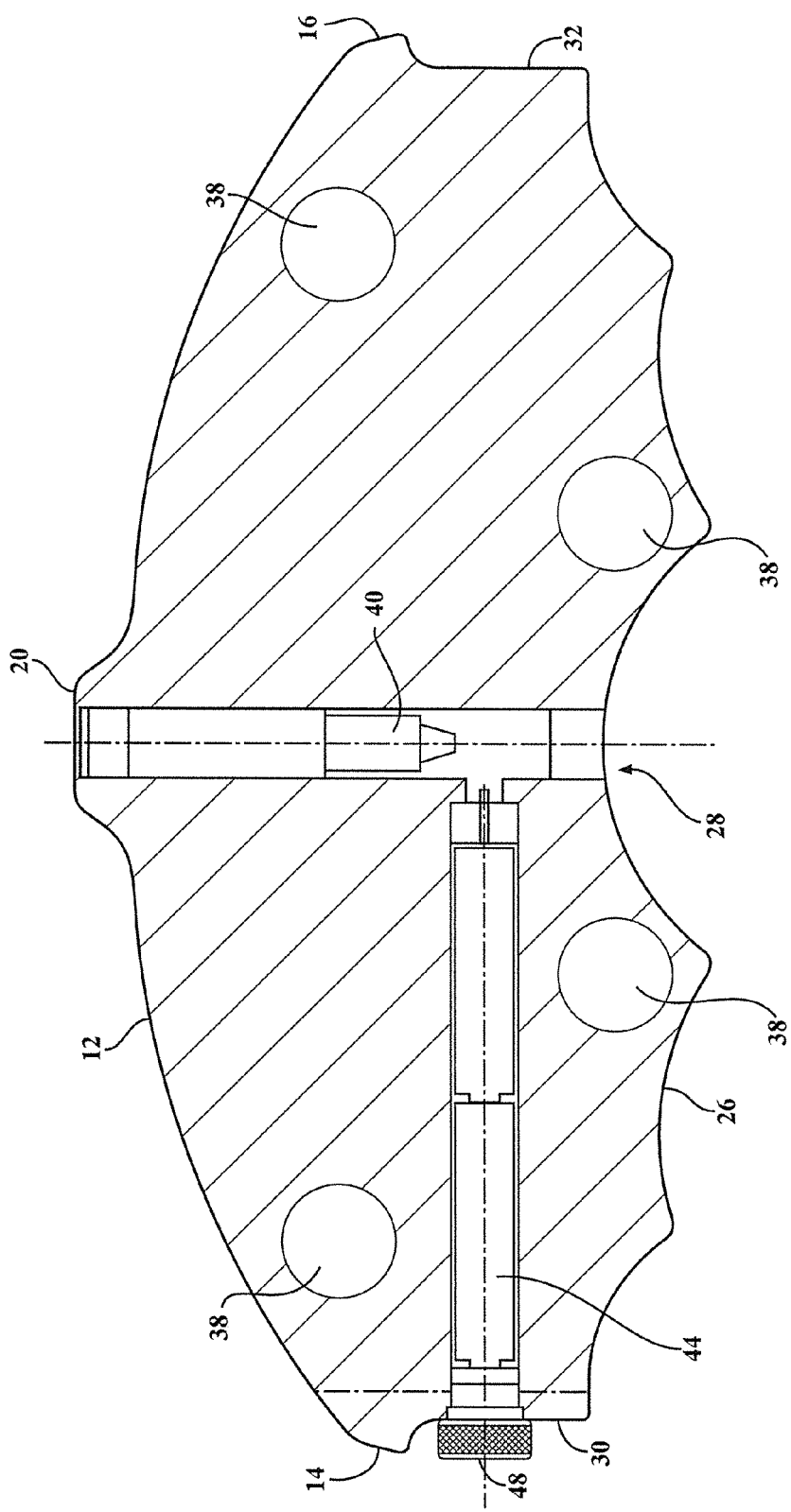
FIG. 3 is a cut-away of an embodiment of a laser alignment tool in accordance with the present invention.

Referring to FIGS. 1-3, a laser alignment tool 10 (also referred to as apparatus 10) is shown in a front perspective view. Laser alignment tool 10 is provided with a housing 11. Housing 11 is defined by an arcuate front surface 12 and an opposed rear surface 26, both of which extend between a top surface 30 and a bottom surface 32. A first side surface 34 and an opposed second side surface 36 are each generally planar and extend between the front, rear, top and bottom surfaces. The first and second side surfaces 34 and 36 may also be referred to as mounting surfaces. In some embodiments, the first and second side surfaces are parallel to each other and the arcuate front surface 12 and rear surface 26 are both perpendicular to the side surfaces. As such, the front surface 12 and rear surface 26 are parallel to each other. The arcuate front surface 12 may be said to have a top end 14 adjacent the top surface 30 and a bottom end 16 adjacent the bottom surface 36. A central region 20 is defined between the top end 14 and bottom end 16 and an aperture 18 is disposed in the central region 20. In the illustrated embodiment, the arcuate front face is smoothly curved between the two ends 14 and 16 with the central region 20 projecting slightly from the curved surface. The curved surface may be of a constant radius or arc or may be curved in other manners. The term "arcuate" should be interpreted to mean a curved surface and is not limited to a constant arc. Further, the curved surface is curved from the top end 14 to the bottom end 16, not from the first side surface 34 to second side surface 36. Most or all of the surface is preferably flat from the first side surface 34 to second side surface 36 and perpendicular to the side surfaces. As shown, the front surface is curved outwardly, so may be considered a convexly arcuate front surface.

As will be described in more detail below, a laser light source is disposed in the body of the tool 10 and configured to project a sheet or plane of laser light from the aperture 18, and this sheet of laser light illuminates the arcuate front face of a corresponding tool disposed on another pulley when the pulley system is in alignment.

The arcuate front surface 12 is further provided with a target pattern 22 disposed thereon. In some embodiments, target pattern 22 is a plurality of lines 24 disposed parallel to one another running lengthwise along the arcuate front surface 12. Plurality of lines 24 may comprise a plurality of patterned color scheme alignment strips extending parallel with the elongated axis of arcuate front surface 12. A central one of the lines 24 of target pattern 22 may be white to clearly display a laser line when a pulley system is near exact alignment. If the pulley system is misaligned and the laser line is not present entirely within a desired line 24 of target pattern 22, such as a line 24 in the center of target pattern 22, the pulley system can be adjusted accordingly until the laser line is properly displayed within the target pattern 22.

Arcuate front face 12 is configured to allow for more accurate alignment when receiving a planar sheet of laser light for display on the target pattern 22. This corresponds to the curved shape of components of a pulley system, such as system 102 in FIG. 4, which has a shaft component 100 or a hub or pulley 104 or 106. This allows misalignment to be more accurately detected. It is further noted that the system of the present disclosure will be able to detect if a component of a pulley system, such as a hub or pulley 104 or 106, is bent or deformed causing further disruption to the corresponding mechanical system.

Rear surface 26 of tool 10 is generally provided with at least one concave arcuate cutout 28. As can be seen in FIG. 1, some embodiments may include a plurality of concave arcuate cutouts having an arched geometry that extends into said housing 11 towards arcuate front surface 12. In certain embodiments, at least one arcuate cutout 28 is positioned between symmetrical arches extending from top surface 30 to bottom surface 32. In this example, the at least one arcuate cutout 28 is relatively larger than the other arches allowing for accommodating and mounting of the tool about various sized components of a pulley system 102, such as a shaft component 100. In general, the arcuate cutouts may be shaped such that they may be positioned about a shaft component 100 of a pulley system 102 when alignment tool 10 is disposed upon a hub 104 or 106 of a pulley system 102. This allows for center of shaft laser alignment. As with front surface 12, arcuate cutout 28 may be curved in other ways that a constant arc. Additionally, the curve is from top to bottom, not side to side. The surface of arcuate cutout 28 is preferably perpendicular to the side surfaces 34 and 36 and a side-to-side line drawn across cutout 28 would be parallel to a side-to-side line drawn across front surface 12.

The top surface 30 is provided proximal to top end 14 of arcuate front surface 12 and may be provided with a power switch 48. This switch may take the form of a closure to enclosing batteries. Bottom surface 32 is positioned proximal to bottom end 16 of arcuate front surface 12, and may be disposed parallel to top surface 30.

First side surface 34 (FIG. 2) is provided perpendicular to said arcuate front surface 12, rear surface 26, top surface 30, and bottom surface 32. In some embodiments, first side surface 34 is provided with a level 46 for determining if a surface on which tool 10 is placed is parallel to the vertical or horizontal plane. In some embodiments, level 46 comprises a liquid level having an air bubble therein for determining the positioning of tool 10 or a surface on which tool 10 rests relative to a vertical or horizontal plane. Such a level 46 may be built in to housing 11 and may comprise a capsuled bubble suspended in a transparent liquid. A level 46 may further comprise a bar-type level having a capsuled bubble suspended in a transparent liquid, wherein the bubble may be positioned between leveling indicia such as solid bars on the level 46 to indicate alignment in a vertical or horizontal plane. In other embodiments, other types of levels well known in the art, such as a digital level, may comprise level 46.

Second side surface 36 is disposed parallel to first side surface 34. Second side surface 36 is generally provided with at least one magnet 38 thereon. Magnets 38 may be used to attach second side surface 36 to a pulley system, such as to a hub or pulley 104 or 106. In some embodiments, at least one aperture 50 may be provided in housing 11. Apertures 50 extend through housing 11 between first side surface 34 and second side surface 36, producing an opening through housing 11. Apertures 50 may be used by a user to hold tool 10 during transport or to manipulate tool 10 during use or positioning on a pulley system 102.

Referring now to FIG. 2, a top view of a laser alignment tool 10 is shown. The edges of arcuate front surface 12, rear surface 26, top surface 30, and bottom surface 32 define the outline of housing 11. As shown, top end 14 and bottom end 16 of arcuate front surface 12 may be disposed at a different relative radius of curvature that the rest of arcuate front surface 12. Likewise, the shape of central region 20 may also differ from the generally curved shape of arcuate front surface 12. As seen in FIG. 2, central region 20 projects outwardly from arcuate front surface 12 and further defines a flat surface in which aperture 18 is disposed. At least one arcuate cutout 28 is disposed in rear surface 26 and arches inwardly towards arcuate front surface 12. In some embodiments, rear surface 26 may be provided with a plurality of arch-shaped cutouts that may accommodate a shaft component 100 of a pulley system 102 when laser alignment tool 10 is mounted on a hub 104 or 106. First side surface 34 is positioned perpendicular to arcuate front surface 12, rear surface 26, top surface 30, and bottom surface 32. In some embodiments, level 46 may be provided in first side surface 34, and allows for a user to determine if a laser alignment tool 10 is level in a vertical or horizontal plane when positioned on a pulley system 102, such as on hub 106. Apertures 50 may also be provided in housing 11. Apertures 50 may be used by a user to grab the laser alignment tool 10 for transportation or for positioning prior to or during use on a pulley system 102. Apertures 50 may be provided in a variety of geometries. Top surface 30 is further provided with power switch 48 to turn the laser alignment tool 10 on and off.

FIG. 3 is a cut-away view of a laser alignment tool 10 as positioned in FIG. 2. FIG. 3 shows several components of laser alignment tool 10 that are disposed within the housing 11. Laser light source 40 is positioned within housing 11, generally midway between top surface 30 and bottom surface 32. In some embodiments, laser light source 40 may be positioned proximal to central region 20 of arcuate front surface 12, such that laser light source 40 is oriented to produce a planar laser light sheet or beam 42 that is projected through aperture 18. Power source 44 is also disposed within housing 11. In one embodiment embodiment, power source 44 is positioned to one side of laser light source 40 proximal to top surface 30, although power source 44 may be positioned at any location within housing 11. Power switch 48 is electrically coupled to power source 44. Power source 44 is further electrically coupled to laser light source 40. In some embodiments, power source 44 comprises a battery or a set of batteries, such as one or more batteries of the AAA type or a pair of AAA batteries. However, one of ordinary skill in the art will recognize that other power sources, such as other types and quantities of batteries, or other sources of alternating or direct current, may also be used to supply power to laser light source 40. In some embodiments, power source 44 may comprise a rechargeable battery, or may comprise a means for providing alternating current power, such as from a wall outlet, to laser light source 40. Power switch 48 may comprise a knob that screws into and out of an aperture to complete the electrical coupling of power source 44, such as a pair of batteries, to laser light source 40. In such an embodiment, rotating the knob in one direction may complete the electrical connection between power source 44 and laser light source 40, causing planar laser light beam 42 to be produced and projected through aperture 18. Contrarily, rotating the knob in the other direction may serve to disrupt the electrical connection between power source 44 and laser light source 40, deactivating the production of planar laser light beam 42. In other embodiments, power switch 48 may comprise a switch, lever, button or other displaceable component having an on position and an off position. In some other embodiments, laser light source 40 may be activated to produce planar laser light beam 42 whenever a power source 44 is in electrical communication with laser light source 40. In some embodiments, laser light source 40 may be a line laser, such as a green line laser or a red line laser. Such a laser light source 40 may be a Class IIIa or the like that produces a planar laser light beam 42 having a beam angle of about 110°, although other beam angles in the range of X° to Y° (Michael—can you give us a range?) may also be provided. The planar laser light beam 42 is generally provided with a narrow width, such as a width of less than 2.5 millimeters at a distance of 5 meters from the laser light source, although a planar laser light beam 42 having a different width may be provided in different embodiments of a laser alignment tool 10. An alternative laser light source may produce a thin beam that is swept up and down to provide a planar sheet of beam. The laser light source may have calibration features allowing for calibration of tool 10. Alternatively, the laser light source may be adjustably mounted in the tool 10 to allow for calibration. At least one magnet 38 can be seen at least partially disposed within housing 11. Generally, magnets 38 are provided to second side surface 36, where they may be disposed on the surface of second side surface 36, or disposed within housing 11 such that only a portion of a magnet 38, such as a flat face surface, are visible on surface 26. Alternatively, magnets 38 may be disposed entirely within housing 11. In some embodiments, a plurality of magnets 38 may be provided, such as four magnets 38 disposed at least partially within housing 11. Magnets 38 may be provided at various locations within housing 11 or on second side surface 36, such as proximal to arcuate front surface 12, particularly near top end 14 and bottom end 16, as well as proximal to rear surface 26, such as adjacent to at least one arcuate cutout 28. As magnets 38 serve to attach laser alignment tool 10 to a pulley system 102, such as to a pulley or hub, one of ordinary skill in the art will recognize that the number, configuration, and positioning of magnets 38 may be varied to accommodate different pulley systems 102 and to allow for the laser alignment tool 10 to be attached securely thereto. In some embodiments, the magnets are fixed in the tool body. Alternatively, they may be adjustably positioned to allow for offset adjustment. However, fixed magnets are preferred.

Figure 4:
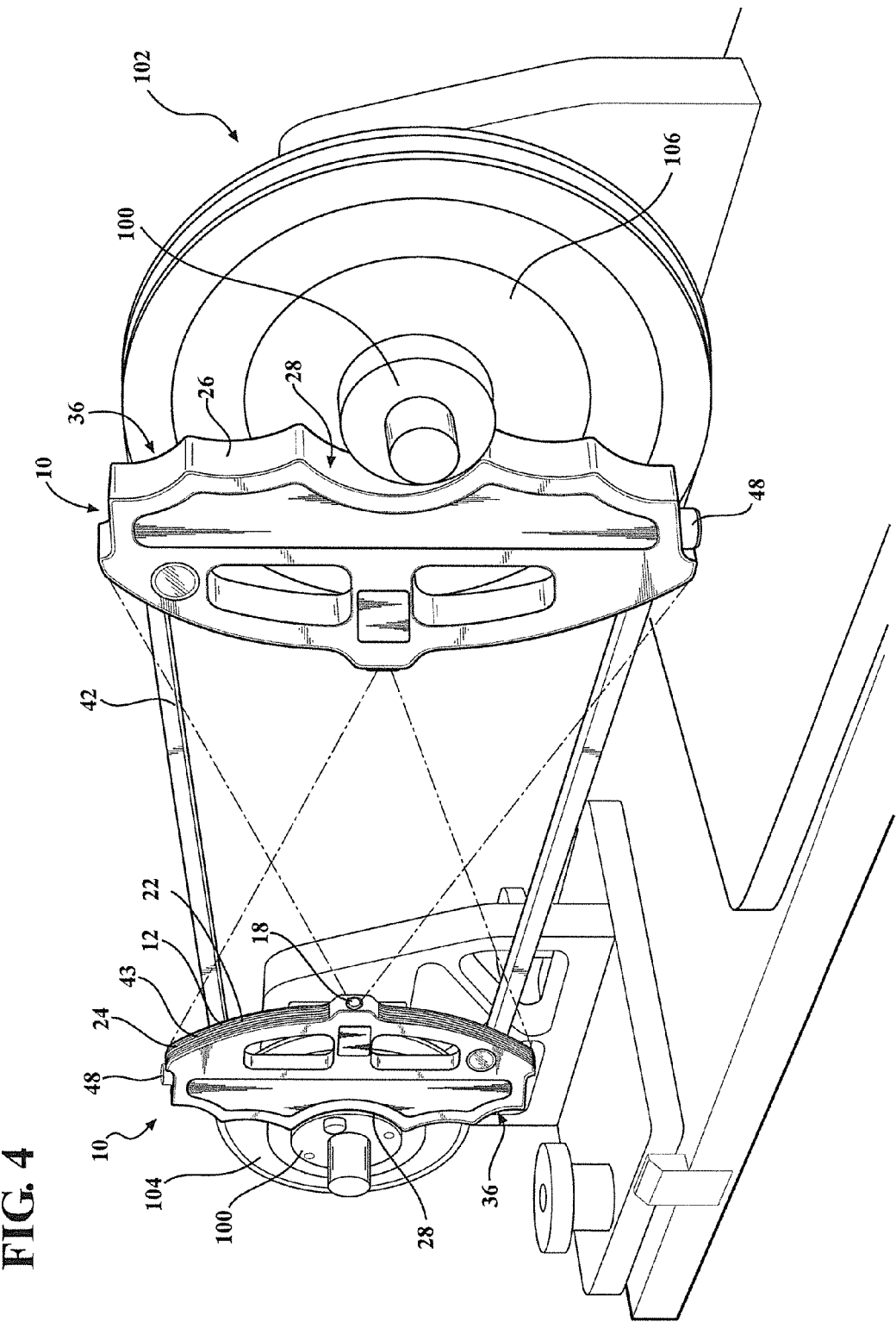
FIG. 4 illustrates a perspective view of a system of two laser alignment tools in use to align components of a pulley system.

FIG. 4 illustrates a system for determining misalignment of components of a pulley system 102 using a pair of laser alignment tools 10. In such a system, a first laser alignment tool 10 is positioned on a pulley hub 104 of a pulley system 102. Generally, magnets 38 provided on mounting surface 36 attach a laser alignment tool 10 to first pulley 104. In positioning laser alignment tool 10 on first pulley 104, arcuate cutout 28 of rear surface 26 may accommodate hub 100 of pulley system 102. This allows the laser alignment tool 10 to be positioned such that the laser light source 40 is aligned with the center of the pulley 104, allowing laser light source 40 to produce a planar laser light beam 42 that originates from the same location as hub 100 and represents the orientation of pulley 104 from the its center. A second laser alignment tool 10 is positioned on a second pulley 106 of the pulley system 102 in substantially the same manner. As can be seen in FIG. 4, laser alignment tools 10 are positioned to face each other; that is, the arcuate front surfaces 12 and target patterns 22 are disposed opposite one another. Once both the first and second laser alignment tools 10 are properly positioned on their respective pulleys 104 and 106 of pulley system 102, power switch 48 on each of the laser alignment tools 10 may be moved to an on position to activate the laser light sources 40 to produce a pair of planar laser light sheets or beams 42. Alternatively, one or both power switches 48 may be moved to an on position prior to mounting the laser alignment tools 10 on the pulleys 104 and 106. Because the laser alignment tools 10 are positioned generally opposite one another, planar laser light beams 42 are projected from apertures 18 towards each other. That is, planar laser light beam 42 of the first laser alignment apparatus 10 mounted on first pulley 104 is projected towards the second laser alignment tool 10 mounted on second pulley 106. Specifically, planar laser light beam 42 of the first laser alignment tool 10 is projected towards and received upon target pattern 22 of the second laser alignment tool 10. Likewise, the planar laser light beam 42 produced by the second laser alignment tool 10 mounted on second pulley 106 is projected towards and received upon target pattern 22 of the first laser alignment tool 10.

Figure 5:
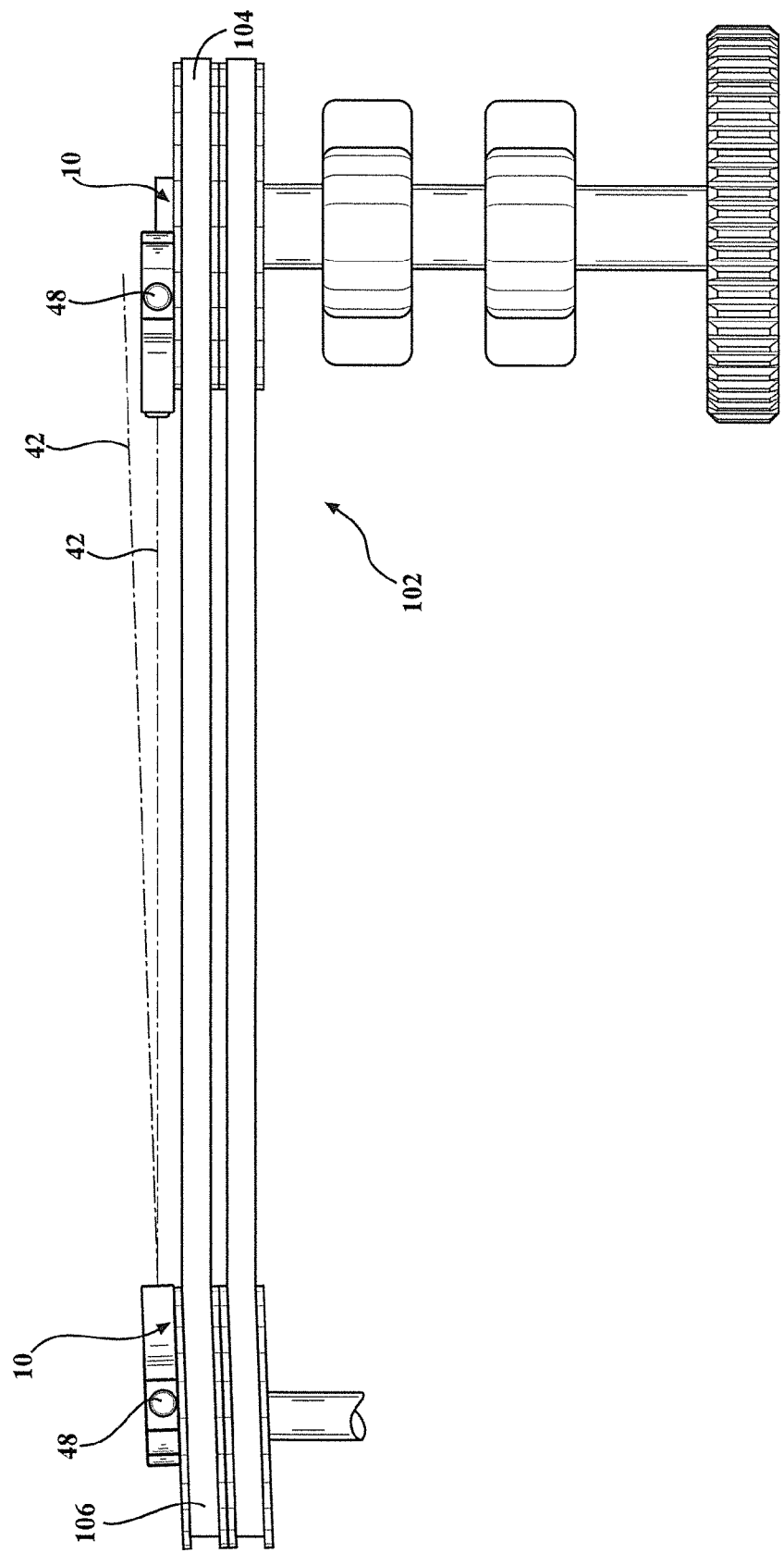
FIG. 5 illustrates a top view of a system of two laser alignment tools in use to align components of a pulley system.

FIG. 5 illustrates a top view of a system for determining misalignment of components of a pulley system 102 using a pair of laser alignment tools 10. Both first and second laser alignment tools 10 have been mounted on first and second pulleys 104 and 106 of pulley system 102, respectively, and the power switches 48 have been moved to the on position to produce planar laser light beams 42. The pulley system 102 in FIG. 5 is further provided with a misalignment. That is, second pulley 106, second laser alignment tool 10, and the planar laser light beam 42 produced thereby are disposed in a different plane than first pulley 104, first laser alignment tool 10, and the planar laser light beam 42 that is produced by first laser alignment tool 10. In this example, the misalignment between pulley 104 and pulley 106 is so severe that planar laser light beam 42 produced by second laser alignment tool 10 is not received on the target pattern 22 of first laser alignment tool 10. However, planar laser light beam 42 produced by first laser alignment tool 10 is received upon target pattern 22 of second laser alignment tool 10. Of course, the misalignment illustrated in FIG. 5 is representative of only one type of misalignment that may be present in a pulley system 102. Components of a pulley system 102 such as pulleys 104 and 106 may be misaligned along their X-, Y-, or Z-axes, or along any combination of the these axes in varying angles and degrees depending on the situation. In one example, components of a pulley system 102 may develop misalignments due to pitch, roll, and yaw displacements or rotations during normal use or other circumstances such as adjustment or maintenance of a pulley system 102. One or more components of a pulley system 102 may experience rotations and movement in one or more of these directions, causing complex misalignments that require adjustment of one or both pulleys 104 and 106 in order to correct for the misalignment. The laser alignment tool 10 provided herein is particularly well suited for detecting and correcting misalignments of the types described herein.

In a situation in which misalignment between components of a pulley system 102 is present, a user would correct for the misalignment between first pulley 104 and second pulley 106 using the laser alignment tools 10 mounted thereon. In the case of a severe misalignment, such as that of FIG. 5, a user would adjust second pulley 106 such that the planar laser light beam 42 produced by second laser alignment tool 10 is received upon target surface 22 of the first laser alignment tool 10. Once both laser alignment tools 10 are positioned such that their respective target patterns 22 receive the planar laser light beam 42 produced by the opposite respective laser alignment tool 10, the user will be able to observe the misalignment between the pulley 104 and 106. That is, the user may view a laser line 43 produced by laser light beam 42 from second laser alignment tool 10 on the target pattern 22 of first laser alignment tool 10. Similarly, a user will be able to view a laser line 43 produced by laser light beam 42 of first laser alignment tool 10 on the target pattern 22 of second laser alignment tool 10. More specifically, the user will be able to view the position and alignment of laser line 43 relative to the plurality of vertical lines 24 that may comprise target pattern 22.

In order to align the components of pulley system 102, the user may first adjust a second pulley 106 to position the planar laser light beam 42 and laser line 43 displayed on target pattern 22 of second laser alignment tool 10 along one of the vertical lines 24. In one example, the user may adjust pulley 106 so that the laser line 43 is aligned with a vertical lines 24 positioned in the center of the target pattern 22. Then, a user may adjust pulley 104 in a similar manner, such that the laser line received on the target pattern 22 of second laser alignment tool 10 is aligned one of the vertical lines 24 of the target pattern 22, such as a vertical line 24 positioned in the center of target pattern 22. Subsequent adjustments of both the first and second pulley 104 and 106 may be necessary to achieve an alignment in which each of the laser lines 43 received on each of the target patterns 22 is aligned with the desired vertical line 24. Additionally, the order in which pulleys 104 and 106 are adjusted may be varied; that is, pulley 104 may be adjusted before, during, or after the adjustment of pulley 106. A satisfactory alignment may be an alignment in which the laser line 43 received on each of the target patterns 22 is aligned with a vertical line 24 in the center of target pattern 22. When such a satisfactory alignment is achieved, a user may then remove laser alignment tools 10 from the pulleys 104 and 106 and the aligned pulley system 102 may then be used.

Figure 6:
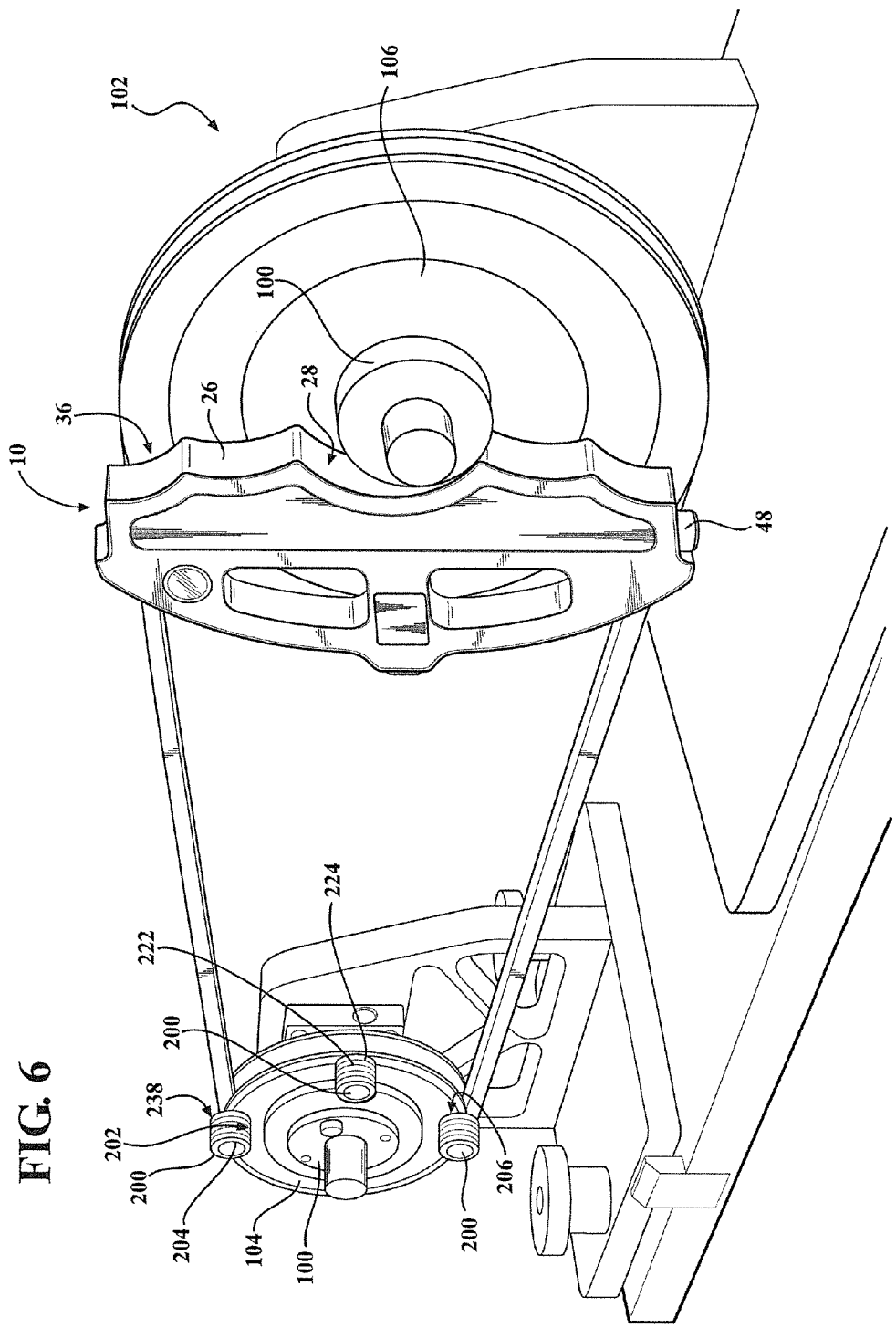
FIG. 6 illustrates a perspective view of a system of one laser alignment tool and a plurality of magnetic targets in use to align components of a pulley system.

FIG. 6 illustrates an alternative embodiment of a system for determining misalignment of components of a pulley system 102 using a laser alignment tool 10 and a plurality of targets 200. The plurality of targets may be used with one tool or with two or more. In such an embodiment, laser alignment tool 10 is mounted on a second pulley 106 as previously described. A plurality of targets 200 are also provided. Targets 200 may be cylinders having a surface area 202, a top surface 204, and bottom surface 206. Surface area 202 may be provided with a target pattern 222, which may be a plurality of vertical lines 224. Bottom surface 206 may be further provided with a magnet 238. Targets 200 may be mounted on a first pulley 104 of a pulley system 102 using magnets 238. A plurality of targets 200 may be arranged on a pulley 104 or 106 as shown in FIG. 6, although one of skill in the art recognizes that such an embodiment may be practiced with as few as one or as many targets 200 as may be mounted on pulley 104. When laser alignment tool 10 is turned on using power switch 48, laser light source 40 produces a planar laser light beam 42 that is projected in the general direction of the targets. Planar laser light beam 42 is therefore received on target pattern 222 of the targets 200.

Figure 7:
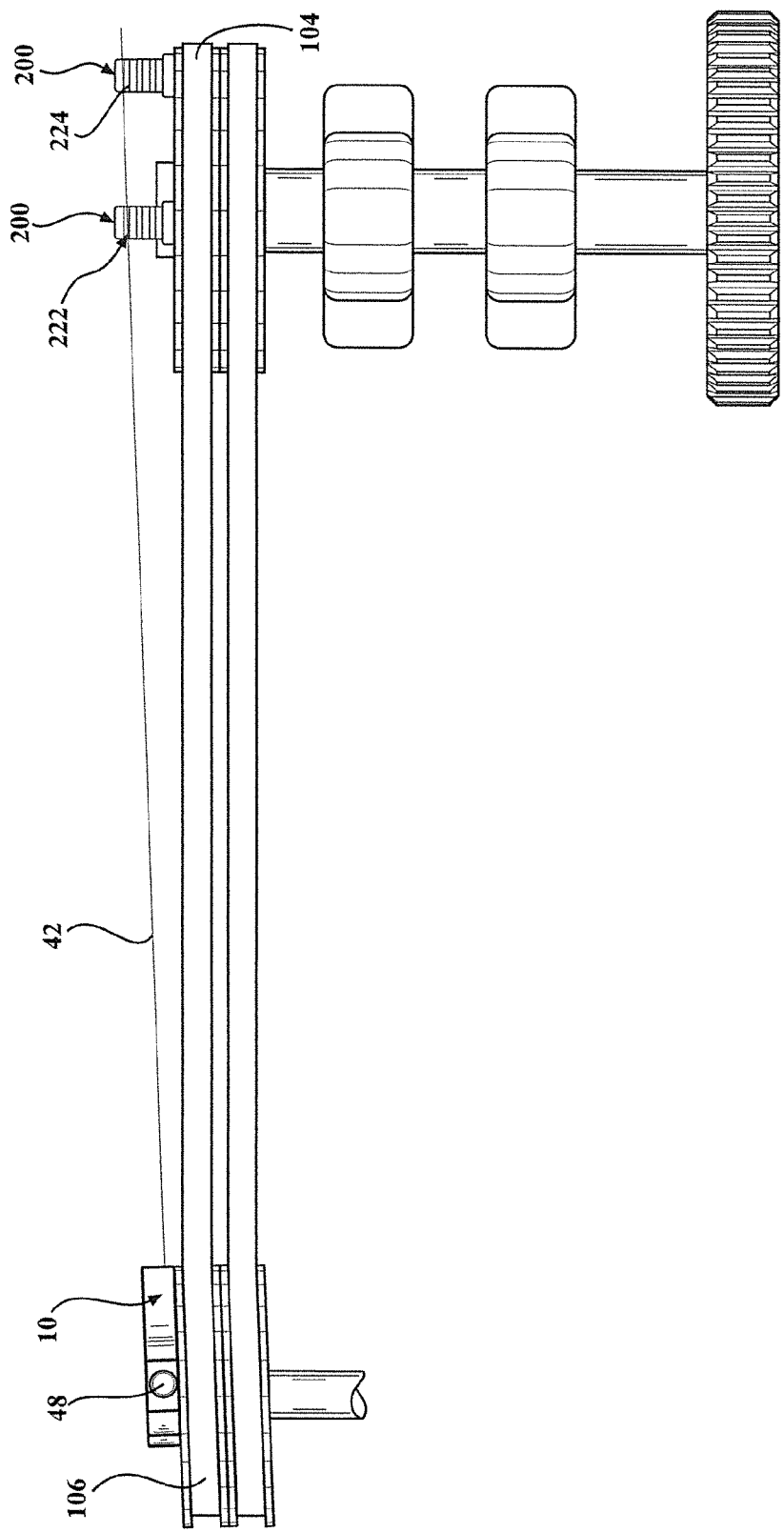
FIG. 7 illustrates a top view of a system of one laser alignment tool and magnetic targets in use to align components of a pulley system.

FIG. 7 illustrates a top view of the alternative embodiment of a system for determining misalignment of components of a pulley system 102 using a laser alignment tool 10 and a plurality of targets 200. Here, laser alignment tool 10 and a plurality of targets 200 have been mounted on second pulley 106 and pulley hub 104 of a pulley system 102, respectively. Laser alignment tool 10 has been turned on using power switch 48 to produce planar laser light beam 42. Planar laser light beam 42 is projected towards targets 200 and is received on the surface area 202, and more specifically target pattern 222, of targets 200. FIG. 7 illustrates a situation in which a misalignment between first pulley 104 and second pulley 106 of pulley system 102 is present. The misalignment may be detected by observing the alignment of planar laser light beam 42 on each of the targets 200. For example, planar laser light beam 42 may be received on a different vertical line 224 of each target 200. This misalignment of the planar laser light beam 42 on the targets 200 may indicate a misalignment of the pulley system 102.

In order to correct such a misalignment between pulleys 104 and 106, a user would first mount a laser alignment tool 10 on pulley 106 and a plurality of targets 200 on pulley 104, and adjust pulley 106 so that planar laser light beam 42 is received on each of the plurality of targets 200. Alternatively, planar laser light beam 42 may be received on each of the plurality of targets 200 without any initial adjustment. Then, a user may observe the disposition of the planar laser light beam 42 on each of the target patterns 222 of the targets 200. In order to correct the misalignment, a user may adjust pulley 104, pulley 106, or both pulleys 104 and 106 in order to position planar laser light beam 42 such that it is received on a desired vertical line 224 on each of the targets 200. In one embodiment, a desired alignment may be an alignment of pulley 104 and 106 such that the planar laser light beam 42 is received on a line positioned in the center of target pattern 222 on each of the targets 200. Once a desired alignment is achieved, a user may then remove laser alignment tool 10 and targets 200 from the pulleys 104 and 106 and the aligned pulley system 102 may then be used. While the alternative embodiment of FIGS. 6 and 7 may be used to align a pulley system, it has certain disadvantages as compared to the first embodiment with two tools 10.

In some embodiments, a laser alignment tool may be provided that does not have a laser light source. Rather, a laser alignment tool may include a modified arcuate front surface with only a target pattern disposed thereon. This modified laser alignment tool may be used in combination with a normal laser alignment tool 10 in a manner similar to that used with targets 200.

Further embodiments of the present invention may have spacers for spacing one or both tools 100 from the side surface of a pulley. For example, a pulley system may have pulleys with different widths, such that the groove in one pulley is a different distance from the side edge than the other pulley. In this case, a spacer may be used with the thinner pulley. Alternatively, and alignment may be done wherein the planar laser sheet from one tool illuminates a line on the arcuate face of the other tool that is not center, but is instead offset one way or the other, and this will be an aligned state of the system. A procedure for dealing with an offset may include using a measuring device, such as a mechanical divider, to measure the distance from the pulley groove center of one pulley to the center line of a tool attached thereto and comparing it to the distance for the other pulley. If targets such as targets 200 are to be used, the distance to the groove center can be compared to the target. If the targets 200 are not tall enough for the offset, taller targets are optionally provided. An example taller target has a height of approximately 1.5 inches.

Embodiments of the present invention have been described for alignment of a pulley system. The terms "pulley" and "pulley system" should be interpreted broadly to include various machine drives or power transfer systems in which the present invention is useful. Embodiments of the present invention may also be useful in aligning other systems as well.

Many modifications and variations of the present disclosure are possible in light of the above teachings and may be practiced otherwise than as specifically described while within the scope of the present disclosure.

The invention claimed is:

1. A laser alignment system for checking alignment of components of a pulley system of the type having a pair of pulleys intended to each be disposed in a substantially identical pulley plane, the laser alignment system comprising:
   a first laser alignment tool having;
   a tool body having an arcuate front surface, an opposed rear surface and a side mounting surface extending therebetween, the arcuate front surface having a target pattern thereon; and
   a laser light source operable to produce a planar laser light beam projecting from the arcuate front surface in a plane parallel to the mounting surface;
   a second laser light alignment tool having;
   a tool body having an arcuate front surface, an opposed rear surface and a side mounting surface extending therebetween, the arcuate front surface having a target pattern thereon; and
   a laser light source operable to produce a planar laser light beam projecting from the arcuate front surface in a plane parallel to the mounting surface;
   wherein when the mounting surface of the first laser alignment tool is disposed against a first pulley of a pulley system and the mounting surface of the second laser alignment tool is disposed against a second pulley of the pulley system, the position of the planar laser light beam of the each laser alignment tool relative to the target pattern on the other laser alignment tool is indicative of whether the pulley system is in alignment.

2. A laser alignment system in accordance with claim 1, wherein the mounting surface of each laser alignment tool is perpendicular to the front surface and to the rear surface of the tool body.

3. A laser alignment system in accordance with claim 1, wherein the target pattern on the arcuate front surface of each tool body comprises at least one line extending along the arcuate front surface parallel to the mounting surface.

4. A laser alignment system in accordance with claim 3, wherein the target pattern on the arcuate front surface of each tool body comprises a plurality of parallel lines having more than one color.

5. A laser alignment system in accordance with claim 1, further comprising at least one magnet having a surface parallel to the mounting surface of each tool, for magnetically attaching the tool body to a metallic pulley.

6. A laser alignment system in accordance with claim 1, further comprising a plurality of targets, each target having a bottom surface for mounting to a pulley surface and a side surface area with a target pattern disposed thereon.

7. A laser alignment system in accordance with claim 1, wherein the arcuate front surface of each tool body has a central region defined between a top end and a bottom end of the front surface, the central region having an aperture defined therein, the laser light beam projecting through the aperture.

8. A laser alignment system in accordance with claim 7, wherein the central region projects from the arcuate surface of the front surface.

9. A laser alignment system in accordance with claim 1, wherein the rear surface of each tool body has at least one concave arcuate cutout portion centered in the rear surface for contact with a hub or shaft of a pulley system to align the tool with the axis of rotation of the hub or shaft.

10. A laser alignment tool for checking alignment of components of a pulley system of the type having a pair of pulleys intended to each be disposed in a substantially identical pulley plane, the laser alignment tool comprising:
   a tool body having an arcuate front surface, an opposed rear surface and a side mounting surface extending therebetween, the arcuate front surface having a target pattern thereon; and
   a laser light source operable to produce a planar laser light beam projecting from the arcuate front surface in a plane parallel to the mounting surface.

11. A laser alignment tool in accordance with claim 10, wherein the mounting surface is perpendicular to the front surface and to the rear surface of the tool body.

12. A laser alignment tool in accordance with claim 10, wherein the target pattern on the arcuate front surface comprises at least one line extending along the arcuate front surface parallel to the mounting surface.

13. A laser alignment tool in accordance with claim 12, wherein the target pattern on the arcuate front surface comprises a plurality of parallel lines having more than one color.

14. A laser alignment tool in accordance with claim 10, further comprising at least one magnet having a surface parallel to the mounting surface of the tool, for magnetically attaching the tool body to a metallic pulley.

15. A laser alignment tool in accordance with claim 10, wherein the arcuate front surface of the tool body has a central region defined between a top end and a bottom end of the front surface, the central region having an aperture defined therein, the laser light beam projecting through the aperture.

16. A laser alignment tool in accordance with claim 15, wherein the central region projects from the arcuate surface of the front surface.

17. A laser alignment tool in accordance with claim 10, wherein the rear surface of the tool body has at least one concave arcuate cutout portion centered in the rear surface for contact with a hub or shaft of a pulley system to align the tool with the axis of rotation of the hub or shaft.

18. A laser alignment tool in accordance with claim 1, further comprising a level disposed in the tool body for checking a level or the tool body with respect to a horizontal or vertical plane.

19. A method for checking alignment of components of a pulley system of the type having a pair of pulleys intended to each be disposed in a substantially identical pulley plane and having opposed grooves for receiving a belt, the method comprising:

providing a first laser alignment tool having;
a tool body having an arcuate front surface, an opposed rear surface and a side mounting surface extending therebetween, the arcuate front surface having a target pattern thereon; and
a laser light source operable to produce a planar laser light beam projecting from the arcuate front surface in a plane parallel to the mounting surface;
providing a second laser light alignment tool having;
a tool body having an arcuate front surface, an opposed rear surface and a side mounting surface extending therebetween, the arcuate front surface having a target pattern thereon; and
a laser light source operable to produce a planar laser light beam projecting from the arcuate front surface in a plane parallel to the mounting surface;
attaching the mounting surface of the first tool to a first pulley of a pulley system, the first pulley generally positioned in the plane parallel to the mounting surface of the first tool;
attaching the mounting surface of the second tool to a second pulley of the pulley system, the second pulley generally disposed in the plane parallel to the mounting surface of the second tool, such that the target pattern of the first tool is directed toward the target pattern of the second tool;
projecting the laser beam from the first tool toward the second tool and projecting the laser beam from the second tool toward the first tool;
checking the position of the laser beam of the first tool relative to the target pattern of the second tool and the position of the laser beam of the second tool relative to the target pattern of the first tool, thereby checking the alignment of the pulley system.

* * * * *